(12) United States Patent
Kashani (10) Patent No.: US 8,800,736 B2
(45) Date of Patent: Aug. 12, 2014

(54) ADJUSTABLE TUNED MASS DAMPER SYSTEMS

(75) Inventor: Ahmad Reza Kashani, Dayton, OH (US)

(73) Assignee: Design, Imaging & Control, Inc., Dayton, OH (US)

( * ) Notice: Subject to any disclaimer, the term of this patent is extended or adjusted under 35 U.S.C. 154(b) by 1195 days.

(21) Appl. No.: 12/455,384

(22) Filed: Jun. 1, 2009

(65) Prior Publication Data

US 2009/0294234 A1 Dec. 3, 2009

Related U.S. Application Data

(60) Provisional application No. 61/057,239, filed on May 30, 2008.

(51) Int. Cl.
*F16F 7/10* (2006.01)

(52) U.S. Cl.
USPC .......................................... 188/379; 267/136

(58) Field of Classification Search
USPC ................ 188/378, 379, 380; 267/136, 64.11
See application file for complete search history.

(56) References Cited

U.S. PATENT DOCUMENTS

| | | | |
|---|---|---|---|
| 4,042,230 A * | 8/1977 | Akimoto ........................ | 267/136 |
| 4,635,892 A * | 1/1987 | Baker ............................ | 248/550 |
| 4,689,821 A | 8/1987 | Salikuddin et al. | |
| 4,715,559 A | 12/1987 | Fuller | |
| 4,821,205 A * | 4/1989 | Schutten et al. .............. | 700/280 |
| 4,876,722 A | 10/1989 | Dekker et al. | |
| 5,071,159 A * | 12/1991 | Kamimura et al. ........ | 280/5.507 |
| 5,125,241 A | 6/1992 | Nakanishi et al. | |
| 5,310,137 A | 5/1994 | Yoerkie, Jr. et al. | |
| 5,343,713 A | 9/1994 | Okabe et al. | |

(Continued)

FOREIGN PATENT DOCUMENTS

| | | | | |
|---|---|---|---|---|
| EP | 0081594 | | 6/1983 | |
| GB | 2189573 A | * | 10/1987 | .............. F16F 15/04 |

(Continued)

OTHER PUBLICATIONS

4:Inspec 1983-1997/EB W1, 1997, Institution of Electrical Engineers, pp. 1-13.

(Continued)

*Primary Examiner* — Bradley King
*Assistant Examiner* — Nicholas J Lane
(74) *Attorney, Agent, or Firm* — Dinsmore & Shohl LLP (57) ABSTRACT

Particular embodiments relate generally to vibration isolation systems and tuned mass dampers. In one embodiment, a vibration isolation system may include a supporting base, an isolated mass, at least one air mount, a control valve, a compressed air supply, and a supervisory controller. The air mount is positioned between the isolated mass and the supporting base. The control valve is pneumatically coupled to the air mount, the compressed air supply and the atmosphere, and is operable to adjust a flow of air to and from the air mount. The supervisory controller receives a mass relative height signal, a mass relative velocity signal, and a mass relative acceleration feedback signal corresponding to a relative acceleration of the isolated mass or a pressure of the air mount. The supervisory controller may control the control valve such that a mounting height, a damping and a stiffness level of the air mount are a function of the mass relative height signal, the mass relative velocity signal, the mass relative acceleration feedback signal, or combinations thereof.

7 Claims, 5 Drawing Sheets

(56) References Cited

U.S. PATENT DOCUMENTS

| | | | |
|---|---|---|---|
| 5,355,417 | A | 10/1994 | Burdisso et al. |
| 5,373,922 | A | 12/1994 | Marra |
| 5,394,478 | A | 2/1995 | Hathaway et al. |
| 5,410,605 | A | 4/1995 | Sawada et al. |
| 5,410,607 | A | 4/1995 | Mason et al. |
| 5,515,444 | A | 5/1996 | Burdisso et al. |
| 5,526,292 | A | 6/1996 | Hodgson et al. |
| 5,535,283 | A | 7/1996 | Saruta et al. |
| 5,558,298 | A | 9/1996 | Pla et al. |
| 5,564,537 | A * | 10/1996 | Shoureshi ............... 188/380 |
| 5,617,315 | A | 4/1997 | Nakao et al. |
| 5,629,986 | A | 5/1997 | Shoureshi |
| 5,651,072 | A | 7/1997 | Nakao et al. |
| 5,666,427 | A | 9/1997 | Kim et al. |
| 5,748,748 | A | 5/1998 | Fischer et al. |
| 5,784,300 | A | 7/1998 | Neumeier et al. |
| 5,841,876 | A | 11/1998 | Gifford et al. |
| 5,974,155 | A | 10/1999 | Kashani et al. |
| 5,978,489 | A | 11/1999 | Wan |
| 6,002,778 | A | 12/1999 | Rossetti et al. |
| 6,018,689 | A | 1/2000 | Kumura et al. |
| 6,031,917 | A | 2/2000 | Mathur |
| 6,151,396 | A | 11/2000 | Maier |
| 6,192,133 | B1 | 2/2001 | Enamito et al. |
| 6,286,644 | B1 * | 9/2001 | Wakui ...................... 188/378 |
| 6,590,639 | B1 * | 7/2003 | Yuan et al. ................. 355/75 |
| 2004/0075202 | A1 * | 4/2004 | Muramatsu et al. ..... 267/140.14 |
| 2007/0284794 | A1 * | 12/2007 | Heiland ................... 267/140.11 |
| 2009/0127044 | A1 * | 5/2009 | Eberhard et al. ............. 188/381 |

FOREIGN PATENT DOCUMENTS

| | | | |
|---|---|---|---|
| GB | 2284282 | 5/1995 | |
| JP | 58196342 A * | 11/1983 | ............... F16F 9/00 |
| JP | 06110474 | 4/1994 | |
| WO | WO9611466 | 4/1996 | |

OTHER PUBLICATIONS

NASA—RECON Database Search Report pp. 1-10.

340:Claims (R)/US Patents ABS 1950-1996/Nov. 1997, IFI/Plenum Data Corp. pp. 19-25.

8:Ei, Compendex(R) 1970-1997/Mar WZ, 1997, Engineering Info. Inc., pp. 14-18.

Fryman, R., "Passive and Actve Damping Augmentation Systems in the Fields of Structural Dynamics and Acoustics", 30th AIAA/ASME/ASME/ASCE/AHS/ASC Structures, Structural Dynamics and Materials Conference, Apr. 3-5, 1989, pp. 348-361.

Hong, J. et al., "Modeling, Identification, and Feedback Control of Noise in an Acoustic Duct", IEEE Transactions on Control Systems Technology, Vo. 4, No. 3, May 1996, pp. 283-291.

Kashani, R., "Active Boom Noise Damping of Dodge Durango", Proceedings of the Society of Automotive Engineers (SAE), Noise and Vibration Conference, Traverse City, MI, 2001, pp. 1-6.

Clark, R., "Active damping of enclosed sound fields through direct rate feedback control", J. Acoust. Soc. Am. 97 (3), Mar. 1995, pp. 1710-1716.

* cited by examiner

ADJUSTABLE TUNED MASS DAMPER SYSTEMS

CROSS REFERENCE TO RELATED APPLICATIONS

This application claims the benefit of U.S. Provisional Application Ser. No. 61/057,239 filed on May 30, 2008 for COMPUTER CONTROLLED AIR ISOLATION SYSTEM.

TECHNICAL FIELD

Embodiments relate generally to vibration isolation and tuned mass damper systems and, more particularly, to isolation and tuned mass damper systems having damping and stiffness adjustability.

BACKGROUND

The goal of vibration isolation systems is to isolate a supporting base from the vibration of an isolated mass caused by a perturbing force, i.e., lowering the force transmitted to the base, while avoiding excessive vibrating motion of the isolated mass. Frequently the isolated mass (e.g., a motor) must also be isolated from the motion of the supporting base (e.g., the chassis of a vehicle) so that the effect of supporting base perturbation on the isolated, mass is minimized. Therefore, isolation systems attempt to lower the transmissibility of vibrations from the isolated mass to the supporting base and vice versa. Passive mounts/springs with negligible damping and low stiffness may be effective in isolating vibration at relatively higher frequencies but may have poor shock isolation characteristics (e.g., abrupt, discontinuous perturbations).

Isolation systems having mounting structures with negligible damping may have the lowest transmissibility at high, off-resonant frequencies. The excessive transmissibility at resonance in such underdamped systems is normally addressed by making their resonant frequencies well below the lowest vibration excitation frequency. Softer mounts (mounts with lower stiffness) may decrease both the transmission of force from the vibrating mass to the base and the transmission of shock inputs at the base to the mass over a reasonably large range in frequencies.

In many isolation applications the isolated mass and supporting base may be subject to both vibration, e.g., the force of operating an internal combustion engine, and shock excitation, e.g., the supporting base excitation in a shipboard machine caused by choppy waters. Shock excitation has normally a broadband spectrum, so some energy at the resonant frequency(ies) of the isolated system may be present. If the mounting structures of the isolation system are highly underdamped, the vibration amplitude at this (these) frequency(ies) may become excessive and cause damage to the isolated system. This problem may be even worse when the shock excitation is not random, but periodic/rhythmic with a harmonic at one of the resonant frequencies of the isolated mass. In this case, the isolation system may amplify the vibration instead of abating it.

Stiffness of the mounts of an isolation system is also a factor in isolation effectiveness, notably at low frequencies. The softer the mount, the higher is its low frequency vibration isolation performance. However, improved isolation using soft mounting structures is achieved at the expense of excessive low-frequency motion of the isolated machine in response to shock disturbances. For example, a diesel engine during start up and shut down experiences excessive undesirable motion due to shock excitation, thereby straining the plumbing, wiring, and exhaust connections to the engine.

Current passive isolation systems do not adequately provide isolation at both high frequency vibrations and shock excitations. For example, double (two-stage) mounting, while it may be effective at high frequencies, has less than desirable low-frequency isolation effectiveness. Additionally, double mounting may impose unfavorable weight and space penalties. Other isolation systems add tuned damping to the isolator at the resonant frequency of the isolated system, such as hydraulic engine mounts used in automobiles. Although applicable as an engine mount where the mass of the engine is not a time varying parameter, the use of passive tuned damping in applications such as semi-trailer truck cab isolation and seat suspension in agricultural and earth-moving machinery having time-varying mass is not very practical.

Accordingly, alternative isolation systems are desired.

SUMMARY

In one embodiment, a vibration isolation system may include a supporting base, an isolated mass, at least one air mount, a control valve, a compressed air supply, and a supervisory controller. The air mount is positioned between the isolated mass and the supporting base. The control valve is pneumatically coupled to the air mount, the compressed air supply, and the atmosphere, and is operable to adjust a flow of air to and from the air mount. The supervisory controller receives a mass relative height signal corresponding to a vertical displacement of the mass with respect to the supporting base or an air pressure of the air mount, a mass relative velocity signal corresponding to a relative velocity of the mass with respect to the supporting base, and a mass relative acceleration feedback signal corresponding to a relative acceleration of the isolated mass with respect to the supporting base or the air pressure of the air mount. The supervisory controller is programmed to control the control valve such that a mounting height of the air mount, a damping level of the air mount, and a stiffness level of the air mount are a function of the mass relative height signal, the mass relative velocity signal, the mass relative acceleration feedback signal, or combinations thereof.

In another embodiment, a vibration isolation system may include a supporting base, an isolated mass, at least one main air mount, at least one main control valve, at least one stiffness air mount, at least one stiffness control valve and a compressed air supply. The main air mount is pneumatically coupled to the main control valve which provides a flow of air to and from the main air mount. The stiffness air mount is pneumatically coupled to the stiffness control valve which provides a flow of air to and from the stiffness air mount. The main air mount and the stiffness air mount are positioned between the isolated mass and the supporting base. The stiffness air mount may be controlled to enter an engaged state and a disengaged state. In the engaged state, the stiffness air mount is engaged with the isolated mass. In the disengaged state, the stiffness air mount is disengaged from the isolated mass. The vibration isolation system is configured to receive an engagement signal and further configured to engage the stiffness air mount with the isolated mass in accordance with the engagement signal, vary air pressure in the stiffness air mount in accordance with the engagement signal, and disengage the stiffness air mount in accordance with the engagement signal.

In yet another embodiment, a tuned mass damper may include an inertia element, at least one air spring, at least one control valve, a compressed air supply, and a supervisory controller. The control valve is pneumatically coupled to the air spring, the compressed air supply, and may be controlled to adjust a flow of air to and from the air spring. The air spring is positioned between the inertia element and a vibrating structure such that the inertia element is coupled to the vibrating structure. The mass of the inertia element and the stiffness of the air spring are such that a resonant frequency of the inertia element and the air spring is substantially equal to a vibration frequency of the vibrating structure. The supervisory controller is configured to dynamically adjust a damping level of the air spring and a stiffness level of the air spring by applying a drive signal to the control valve.

BRIEF DESCRIPTION OF THE DRAWINGS

The embodiments set forth in the drawings are illustrative and exemplary in nature and not intended to limit the inventions defined by the claims. The following detailed description of the illustrative embodiments can be understood when read in conjunction with the following drawings, where like structure is indicated with like reference numerals and in which:

DETAILED DESCRIPTION

Embodiments relate generally to vibration isolation and tuned mass damper systems and, more particularly, to vibration isolation and tuned mass damper systems having damping and stiffness adjustability. Embodiments disclosed herein may provide vibration isolation systems (and tuned mass dampers/absorbers) having enhanced shock isolation without compromised vibration isolation effectiveness by utilizing an on-demand, active damping scheme that adds various levels of damping to an air mounted/suspension application (e.g., the cab isolation in a semi-trailer truck) depending on the instantaneous urgency of shock isolation over vibration isolation. Shock excitation is defined herein as perturbation that is relatively low in frequency and may be non-harmonic or abrupt/discontinuous, such as the initial firing of a diesel engine or a boat sailing through choppy waters. Vibration excitation is defined herein as harmonic perturbation that is relatively high in frequency, such as the vibrations caused by the operation of a generator. In addition to the active damping scheme, embodiments may also incorporate an on-demand, active stiffness control that may operate in parallel with the active damping control. Depending on the operating conditions, the stiffness of the air mount may be dynamically lowered to better its vibration isolation, or increased to enhance its shock isolation. Some embodiments may utilize semi-active control rather than active control to dynamically adjust the stiffness of the vibration isolation system. The adjustability of the damping and stiffness levels may also be incorporated into tuned mass damper/dynamic absorber systems, using air springs as their resilient element, to dynamically provide the necessary amount of damping and periodically re-tune the system.

As described above, embodiments described herein may dynamically adjust a damping level and a stiffness level of the vibration isolation system in response to operational conditions. Air mounts in a vibration isolation system may be soft and highly underdamped when vibration isolation is of paramount importance. For example, assume that an isolated mass is a genset that is coupled to a yacht via an exemplary vibration isolation system. When the yacht is docked or at anchor in calm waters and passengers are on board, there may be little shock excitation due to choppy waters. However, the genset may cause vibration that may be felt by the passengers. Therefore, the vibration isolation system may operate in a soft and underdamped state to prevent the vibration excitation from being transmitted to the yacht structure and felt by passengers onboard. Embodiments of the present disclosure may be utilized in any number of applications. As another example, a vibration isolation system may be implemented in a semi-trailer truck to isolate the cab from the rest of the vehicle and any trailers. Vibration isolation systems as described herein may also be used to isolate seats of a vehicle to prevent vibrations transmitted to and from the seat.

Embodiments may then switch to a damped state when a shock excitation is present and shock isolation takes precedence over vibration isolation. As described above, the overall stiffness of the vibration isolation system may be dynamically adjusted. In some embodiments, the vibration isolation system may operate in a damped and stiff state when shock excitation is present at the isolated mass. For example, when a diesel engine in a diesel generator (genset) is initiated, shock excitation may be present which may cause the genset to rock back and forth. The dynamic adjustment of the damping and stiffness of the vibration isolation system may prevent damage to isolated mass due to excessive movement caused by the shock excitation. When a shock excitation is present in the supported base, such as the hull of a yacht, the vibration isolation system may operate in a damped and soft state. Once the excessive motion subsides, the vibration isolation system may then go back to a highly-underdamped and soft state.

Figure 1:
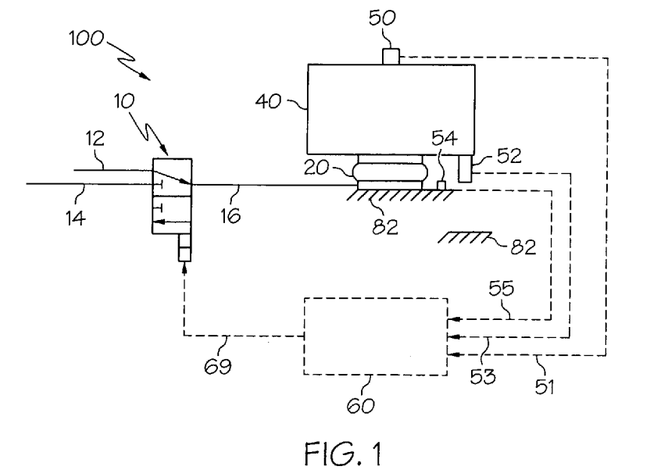
FIG. 1 is a schematic of an exemplary isolation system according to one or more embodiments.

Referring initially to FIG. 1, a schematic of an exemplary vibration isolation system 100 is illustrated. An isolated mass 40, such as an engine, is coupled to a supporting base 82, such as the chassis of a vehicle or a hull of a ship, via an air mount 20. It is noted that only one air mount 20 is illustrated in FIG. 1, and that an isolated mass 40 may be coupled to a supporting base by many air mounts 20. The air mount 20, which may be a convoluted air spring, for example, provides damping and stiffness adjustability to the vibration isolation system 100. Further the air mount 20 may provide low stiffness (which in conjunction with the isolated mass results in low natural frequency) enabling air mount 20 to provide the highest degree of low-frequency isolation, large load-bearing properties without extreme static deflection, despite its low stiffness, and negligible overall damping enhancing high-frequency isolation.

A control valve 10 connected to a compressed air supply 11 (FIG. 2) via pneumatic line 12 is coupled to the air mount 20 by pneumatic line 16. The control valve 10, which may be a high-speed servo valve capable of quickly adjusting air flow to the air mount 20 in response to a drive signal 69. The control valve 10 also comprises an exhaust port 14. In the illustrated embodiment, the vibration isolation system 100 comprises a supervisory controller 60 that generates and provides the drive signal 69 to the control valve 10 in response to feedback signals 51, 53 and 55. The supervisory controller 60 may reside in a computer or other similar hardware, and is configured to adjust the flow of air either from the compressed air supply to the air mount 20 or from the air mount 20 to atmosphere (exhaust). The supervisory controller 60 may control a plurality of control valves 10.

The feedback signals 51, 53 and 55 may be provided to the supervisory controller 60 by accelerometers 50 and 54 and displacement sensor 52. A displacement sensor 52 and a first accelerometer 50 may be positioned on the isolated mass 40 while a second accelerometer 54 may be positioned on the supporting base 82. These sensor elements are configured to measure the relative displacement and acceleration (displacement and acceleration of the isolated mass 40—displacement and acceleration of the supporting base 82), that is the relative displacement and acceleration of one end of the air mount 20 (attached to the isolated mass) with respect to the other end (attached to the supporting base 82). When the motion of the supporting base 82 is negligible, which is the case in some isolation applications, only the displacement of the isolated mass 40 (with respect to its static equilibrium) and the acceleration of the isolated mass 40 need to be sensed and fed back to the supervisory controller 60. It will be understood that more or fewer sensors may be utilized.

Figure 2:
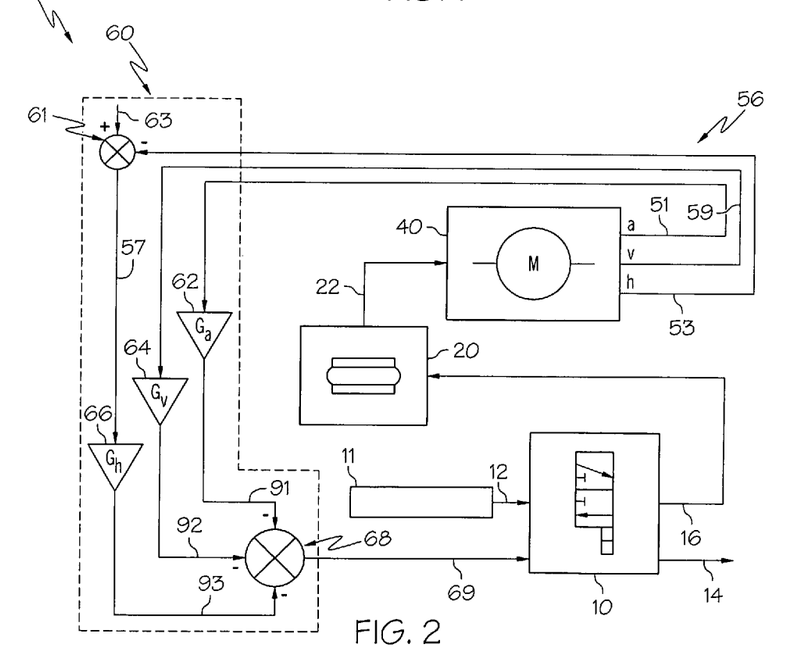
FIG. 2 is a schematic block diagram of an exemplary isolation system according to one or more embodiments.

Referring now to FIG. 2, the supervisory controller 60 may provide real-time adjustments to damping and stiffness levels of the vibration isolation system 100 using active control. Low-bandwidth (slow), feedback control schemes such as height and pressure control have been traditionally used in air mounted applications. For example, height control is commonly used where the isolation height in a system with time-varying mass needs to be maintained and the isolation height needs to be adjusted depending on the operating conditions. Pressure control is another low-bandwidth feedback control scheme commonly used in air isolation applications. In addition to the aforementioned height/pressure control, embodiments may also utilize control schemes such as active damping control, active stiffness control, semi-active stiffness control, and semi-active lateral stiffness control.

A mass relative acceleration signal 51, a mass relative velocity signal 59 and a mass relative height signal 53 may be provided to the supervisory controller 60. The mass relative acceleration signal 51 is the acceleration of the isolated mass 40 relative to the supporting base 82, the mass relative velocity signal 59 is the velocity of the isolated mass 40 relative to the supporting base 82, and the mass relative height signal 53 is the height of the isolated mass 40 relative to the supporting base 82. Within the supervisory controller 60 are gain circuits (or values in software) that may be applied to the incoming signals 56. The height signal 53, which may be configured as the slowest outer loop, may be adjusted in accordance with a mounting height error evaluated by 61 and reference mounting height 63. A height gain $G_h$ at 66 is applied to the height error signal 57. Similarly, a velocity gain $G_v$ at 64 is applied to the velocity signal 59 and an acceleration gain $G_a$ at 62 is applied to the acceleration signal 51. After the gains are applied to the corresponding input signals 56, the resulting feedback output signals 91-93 are summed together and provided to the control valve 10 as drive signal 69. Therefore, all feedback loops, through their corresponding gains, affect the flow from the control valve 10 to the air mount 20. Active control may be used to regulate the height (by height feedback), adjust the damping (by acceleration feedback), and control the stiffness (by velocity feedback) of the mounted system through their corresponding gains $G_h$, $G_a$, and $G_v$. As described in more detail below, the control schemes developed for adjusting the damping and stiffness of air springs in vibration isolation system 100 can also be extended to other vibration control solutions such as tuned mass dampers/dynamic absorbers.

Active control of stiffness and damping with the objective of enhancing the vibration and shock isolation attributes of the air mount 20 may be realized by continuously varying the dynamic component of pressure through the adjustment of the flow of air in and out of the air spring.

Feedback force proportional to the velocity and acceleration of the isolated mass 40 (measured with respect to the supporting base 82, i.e., relative velocity and acceleration) results in active stiffness and damping control, respectively. Due to integration dynamics of an air spring, damping control may be realized by feeding back the relative acceleration (the integral of which becomes relative velocity), and stiffness control may be realized by feeding back the relative velocity (the integral of which becomes relative displacement) of the isolated mass 40. In other words, making the flow rate of air provided to the air mount 20 (the actuation) proportional to relative acceleration of the isolated mass 40 results in active damping and making the flow rate proportional to relative velocity of the isolated mass 40 results in active stiffening control.

As discussed above, a lack of damping in mounting structures such as air mount 20 may enhance high-frequency vibration isolation. However, a side-effect of low damping may be the creation of a highly underdamped, low-frequency resonance which may deteriorate the shock isolation capability of the mount. Embodiments may provide synthesized active damping that addresses the shortcoming of underdamped resonance (poor shock isolation) while maintaining the desirable attribute of effective vibration isolation. Considering that air mounts in isolation applications may be either under pressure or height regulation, the proposed control schemes of some embodiments may be readily realized by modifications to existing control hardware and software.

In the embodiment illustrated in FIGS. 1 and 2, air is flown in and out of the air mount 20, via the control valve 10, under the control of a control scheme feeding back a mass relative acceleration feedback signal in the form of the relative acceleration 51 of the isolated mass 40 with respect to the supporting base 82. In other embodiments, the mass relative acceleration feedback signal may be the dynamic pressure of the air mount 20. Depending on the feedback configuration and control algorithm, both band-limited and tuned damping can be realized as described below.

Band limited damping may be realized by feedback control that is proportional to the relative acceleration (e.g., acceleration signal 51) of the isolated mass 40 with respect to the supporting base 82, which may make the air mount 20 exhibit the behavior of a dashpot while also maintaining its resilience. This feedback scheme makes the air flow, adjusted by the control valve 10, proportional to the relative acceleration of the isolated mass 40 with respect to the supporting base 82. The pressure in the air mount 20 (which through the effective area of the air mount 20 provides the control force) is proportional to the accumulation (integration) of air flow through the control valve 10. Therefore, the control force in the air mount 20 is proportional to the relative velocity of the isolated mass 40 with respect to the base, analogous to that of a dashpot but limited in bandwidth. Thus acceleration feedback control allows the air mount 20 to exhibit band-limited viscous damping. The finite bandwidth of the control valve 10 and further low-pass filtering of the acceleration signal 51 within the supervisory controller 60 may limit the bandwidth of viscous damping providing for viscous damping that is harmless to high-frequency isolation performance of the vibration isolation system 100. The extent of damping provided by the supervisory controller 60 may vary depending on the severity of the sensed vibration.

Embodiments may also utilize tuned damping as opposed to the band limited damping described above. An alternative to feeding back relative acceleration via a proportional controller, which results in band-limited damping somewhat similar to the damping of a dashpot paired with the air mount 20, air mount pressure or the relative acceleration (or other attributes of motion such as velocity) may be fed back through an appropriate second order controller within the supervisory controller 60 tuned to the main resonance of the mounted system. This results in a narrowband damping similar to that of a tuned mass damper appended to an isolated mass. Although more complex than band-limited damping, tuned damping has the advantage of providing damping without deteriorating high-frequency vibration isolation effectiveness. For time varying systems, a self-tuning scheme may be provided in the supervisory controller 60 to re-tune the vibration isolation system 100. As stated above, the dynamic pressure of the air mount 20 may be used as an alternative to relative acceleration as a mass relative acceleration feedback signal for tuned damping. Although the parameters of the second order feedback controller (for tuned damping) fed by pressure will be different from the second order feedback controller fed by acceleration, the tuned damping effectiveness would be comparable.

Active stiffness control may be provided by controlling the flow of air to the air mount 20 in response to feeding back a relative velocity of the isolated mass 40 with respect to the supporting base 82. In many air isolated systems using properly sized air springs, vertical natural frequencies as low as 2.0 Hz may be realized. With active stiffness control, even lower natural frequencies, by softening the mount, may be obtained without increasing the size of the air mounts 20 or connecting the air mounts 20 to bulky auxiliary air reservoirs. Active stiffness control can also be used to stiffen a soft air mount when low-frequency motion of the mass, in response to shock inputs (particularly shock inputs that disturb the isolated mass 40), is excessive. This control strategy (i.e., "active stiffening") may be switched off (making the mount exhibit its own natural, soft behavior) when any excessive motion has subsided and vibration isolation is again the main priority.

Air mounts 20 configured as convoluted air springs may not provide adequate lateral stiffness due to their convoluted geometry and the use of fabric reinforced elastomeric material in their construction. While this lateral softness may be an advantage for vibration isolation, it may be a disadvantage for shock isolation because excessive lateral motion of the isolated mass 40 may be created in response to lateral shock inputs. In applications that demand higher lateral stiffness levels than are provided by convoluted air springs, each air mount 20 in the vibration isolation system 100 may be configured with thicker rubber/neoprene walls that are structurally re-enforced with steel rings. These types of air springs, which may be referred to as pneumatic air springs, may be substantially stiffer in the lateral directions and somewhat stiffer in the main vibration direction than equivalent convoluted springs. This higher stiffness in both directions may result in lowering the vibration isolation performance of the vibration isolation system 100.

Active stiffness control may be used to lower the stiffness of air mounts 20, such as convoluted or pneumatic air springs, in the main vibration direction when vibration isolation is a priority. When shock control (and thus higher stiffness in the mount) is of high priority, the active stiffness control scheme may be either switched off by the supervisory controller 60 making the air mount 40 to exhibit its own inherent (natural) stiffness, or change polarity/sign to stiffening the air mount 40 further beyond its own inherent (natural) stiffness. Feedback control proportional to the relative velocity of the isolated mass 40 with respect to the supporting base 82 will make the air mount 20 exhibit the behavior of a softer or stiffer spring than the uncontrolled air mount 20 itself, depending on the polarity and extent of the drive signal 69 provided by the supervisory controller 60.

Figure 3:
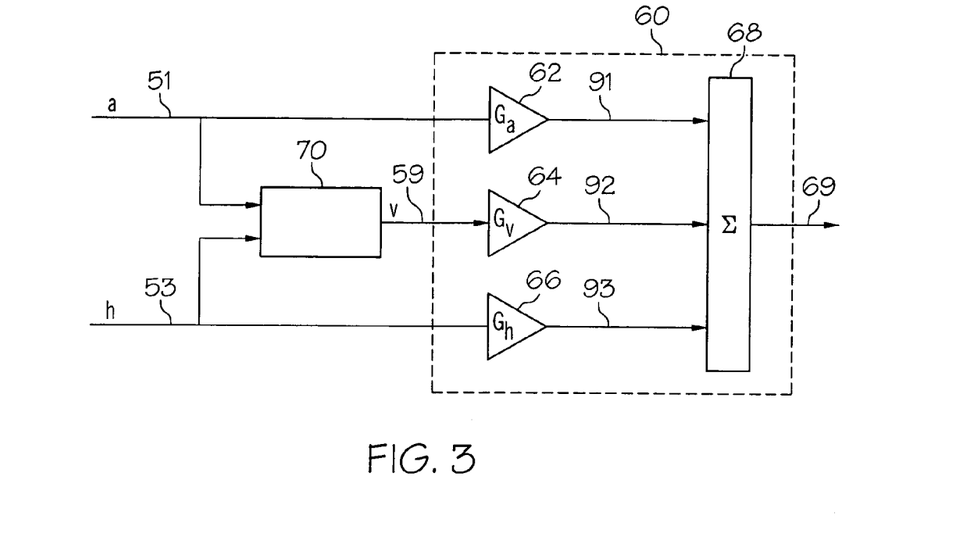
FIG. 3 is a schematic block diagram of a portion of an exemplary feedback loop according to one or more embodiments.

The relative velocity signal 59 may be provided by one or more velocity sensors (not shown) or a velocity estimator 70 (FIG. 3). Considering the low-frequency nature of air mounted system, velocity sensors that are either inductive (based on the motion of coil inside a magnetic field) or are based on integration of an acceleration signal might not provide an accurate/fast measurement of the relative velocity of the isolated mass 40. Additionally, differentiation of displacement signals may also be too noisy to provide an acceptable signal. As such, a velocity estimator 70 may be utilized to provide a fast and accurate estimation of the relative velocity of the isolated mass 40.

Referring to FIG. 3, a velocity estimator 70 is utilized to provide a velocity signal 59 that is an estimate of the actual relative velocity of the isolated mass 40. The velocity estimator 70, which may be a kinematic Kalman filter, for example, estimates the relative velocity of the isolated mass 40 using the acceleration signal 51 and the height signal 53. The acceleration signal 51 is used both as the damping control feedback signal and also as an input to the velocity estimator 70. The velocity estimator 70 uses the acceleration signal 51 in conjunction with the height signal 53 to provide an estimate of the relative velocity of the isolated mass 40 in the form of velocity signal 59, which will in turn be used as the stiffness control feedback signal. Moreover, the height signal 53 is also used as an input to the height gain $G_h$ to generate the low-bandwidth (slow) mass height feedback output signal 93 regulating the mounting height of the isolated mass 40. It will be understood that other embodiments may incorporate a velocity sensor or sensors to directly measure the relative velocity of the isolated mass 40 for stiffness control rather than using a velocity estimator.

As illustrated in FIGS. 2 and 3, the drive signal 69 that is applied to the control valve 10 comprises a summation of the height feedback output signal 93, the velocity feedback output signal 92 (stiffness control), and the acceleration feedback output signal 91 (damping control). The outer height loop is the slowest feed back loop while the inner acceleration loop is the fastest. The extent and sign of the drive signal 69 adjusts the movement of the spool within the control valve 10 to affect the flow to and from the air mount, thereby actively controlling the mounting height, damping, and stiffness of the vibration isolation system 100.

Figure 4:
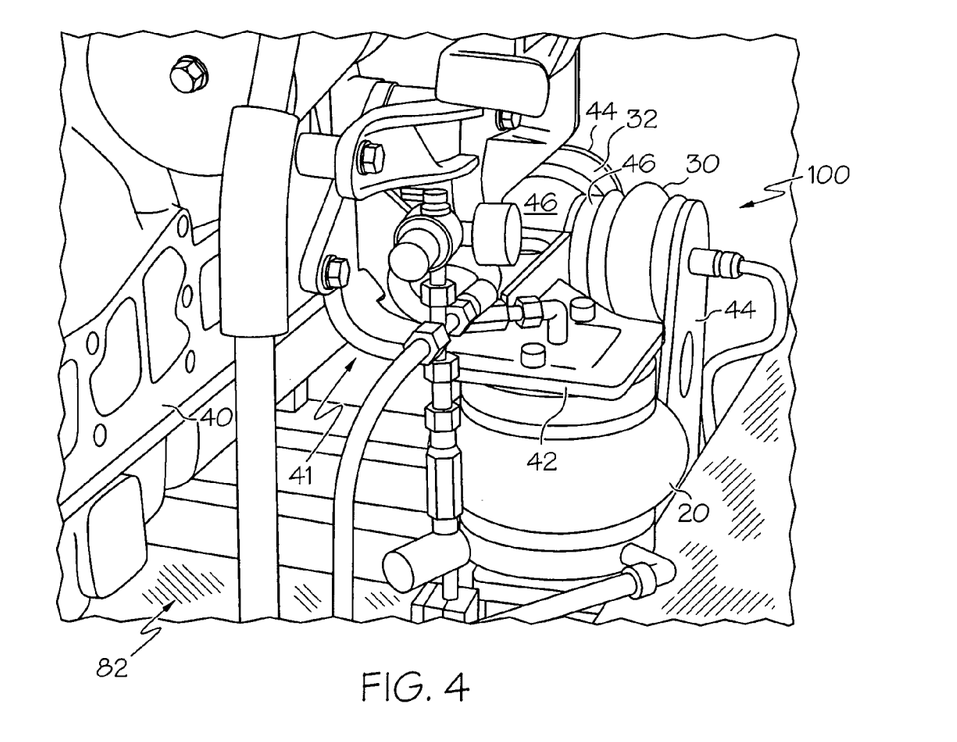
FIG. 4 illustrates a perspective view of an exemplary isolation system according to one or more embodiments.

Referring now to FIG. 4, some embodiments may utilize semi-active stiffness control in both the main (e.g., vertical) and lateral directions rather than, or in addition to, active stiffness control. An alternative to the use of a pneumatic air spring as the air mount 20 for providing lateral stiffness is the use of stiffness air mounts 30, 32 in the lateral directions in addition to a main air mount 20 in the main vibration direction. The stiffness air mounts 30, 32 and main air mounts 20 may be configured as convoluted air springs with each having an independent stiffness control valve, such as solenoid valve and an electronic pressure regulator. Alternatively, the stiffness air mounts 30, 32 may be controlled by a single stiffness control valve (not shown). The isolated mass 40 may be supported by a plurality of main air mounts positioned about the isolated mass 40. For example, a main air mount 20 may be located at a mounting foot 41 at each corner of the isolated mass 40. Placing a first air mount 30 and a second air mount 32 (or any even number of such air springs) in the lateral directions, facing each other, around the isolated mass 40 may provide the additional support (stiffness) in the lateral directions, thereby keeping the isolated mass 40 from excessive back-and-forth, lateral motion. FIG. 4 illustrates one mounting foot 41 of an isolated mass 40 (e.g., a diesel generator) isolated by one main convoluted air mount 20 and a first and second stiffness convoluted air mounts 30, 32. One end of the stiffness air mounts 30, 32 may be connected to the supporting base 82 by way of vertical brackets 44 and to the isolated mass 40 by way of vertical brackets 46. The other three mounting feet of the isolated mass 40 may be isolated in a similar manner.

The air pressure inside of the stiffness air mounts 30, 32 may be adjusted, independent of the air pressure in the main air mount or mounts 20, from total disengagement to its maximum allowable pressure. In one embodiment, the stiffness control valve may be configured to position the stiffness air mount or mounts 30, 32 into an engaged or disengaged state. To enter the disengaged state, the stiffness control valve may be configured to pull back the stiffness air mounts 30, 32 toward the vertical bracket 44 by applying a vacuum pressure to the stiffness air mounts 30, 32 after being deflated in accordance with an engagement signal. In another embodiment, the stiffness air mounts 30, 32 may be spring loaded such that the stiffness air mounts 30, 32 may be engaged in accordance with the engagement signal and disengaged mechanically upon being deflated.

The engagement control signal may originate from any source either internal (e.g., via sensors and a controller) or external to the vibration isolation system 100 (e.g., a main computer of a ship), and may correspond to detected motions of either the isolated mass 40 and/or the supported base 82. For example, an on-board computer of a yacht may detect the motion of the yacht as being excessive and provide an engagement signal accordingly. The engagement signal may also instruct the stiffness control valve or valves to vary the air pressure of the stiffness air mounts 30, 32 in accordance with a degree of yacht motion.

The placement of the stiffness air mounts 30, 32 in opposing directions around the isolated mass 40 may allow for variation in air pressure without over-stretching/extending the mounts. In addition to semi-active control of lateral stiffness, varying the pressure of the stiffness air mounts 30, 32 installed laterally allows for semi-active control of stiffness in the main vibration direction. In other words, varying the pressure in the stiffness air mounts 30, 32 not only enables the lateral stiffness of the vibration isolation system 100 to be varied, it also provides a semi-active stiffness control in the main vibration direction as manifested by an increase in the transmission of vibration in the main vibration direction.

Figure 5:
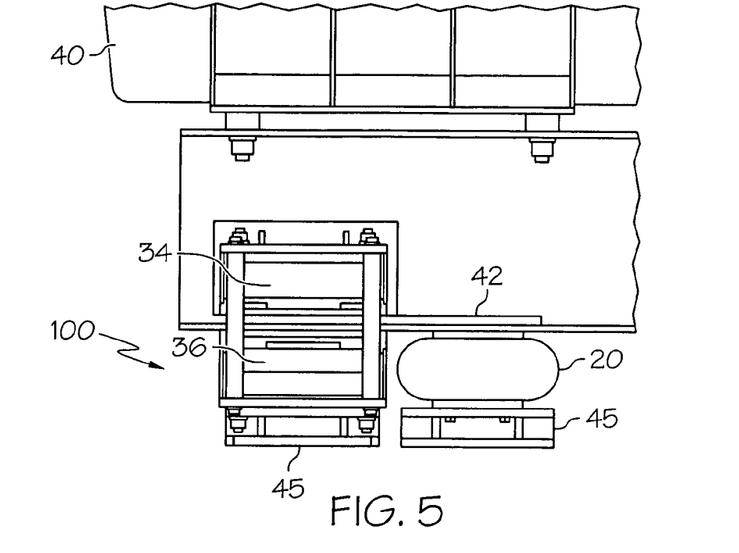
FIG. 5 illustrates a front view of an exemplary isolation system according to one or more embodiments.

FIG. 5 illustrates an embodiment in which lateral stiffness air mounts cannot be accommodated due to lack of space in an isolation application. Rather than utilizing the lateral stiffness air mounts described above, the embodiment illustrated in FIG. 5 combines convoluted and pneumatic air springs that are all installed in the main vibration direction. The main air mount 20 is configured as a convoluted air spring while the two stiffness air mounts 34 and 36 are configured as pneumatic air springs that may be engaged and disengaged in response to an engagement signal. This configuration may enable the vibration isolation system 100 to provide low stiffness in both main and lateral directions to achieve superior vibration isolation in the absence of shock excitations by disengaging (pulling back) the pneumatic mounts, and high stiffness in both the main and lateral directions to achieve shock isolation by engaging the pneumatic stiffness air mounts 34, 36 and varying their air pressure. Main air mounts 20 and pneumatic stiffness air mounts 34, 36 may be positioned about the isolated mass 40 in accordance with the requirements of the particular application. The engagement signal may be provided by any source.

The vibration isolation system 100 may be configured to operate in different damping and stiffness states under either active or semi-active control. The damping control, realized by feeding back relative acceleration of the isolated mass 40 or dynamic pressure in the air mount 20, and stiffness control, realized by feeding back relative velocity of the isolated mass 40 or adjusting pressure in the stiffness air mounts (e.g., lateral stiffness air mounts 30, 32 or pneumatic stiffness air mounts 34, 36), may switch between either various degrees of effectiveness or discrete on and off states. Various levels of automation may be incorporated to initiate the change in the state of the vibration isolation system 100. At one end of this automation spectrum, a selector switch may be used for commanding the supervisory controller 60 to switch the damping and/or stiffness states. At the other end of the spectrum, sensors (e.g., accelerometer 50 and height sensor 52) may be coupled to the supervisory controller 60 so that upon detecting motion signals beyond a certain level, the switching of the damping and stiffness states is effectuated. The switching logic may be programmed into the supervisory control scheme stored within the supervisory controller 60.

The components and principles described above in the context of vibration isolation systems may also be incorporated in dynamic absorber and tuned mass damper systems. Dynamic absorbers and tuned mass dampers are reactive devices appended to structures to either absorb vibration at a certain forcing frequency or damp vibration at a particular resonant frequency. Dynamic absorbers and tuned mass dampers generally comprise an inertia element, a compliant/resilient element, and an energy dissipating element. Dynamic absorbers may have very little damping, while tuned mass dampers may have a sizeable amount of damping. Tuned mass dampers and dynamic absorbers are referred to collectively as "tuned mass dampers" herein.

Figure 6:
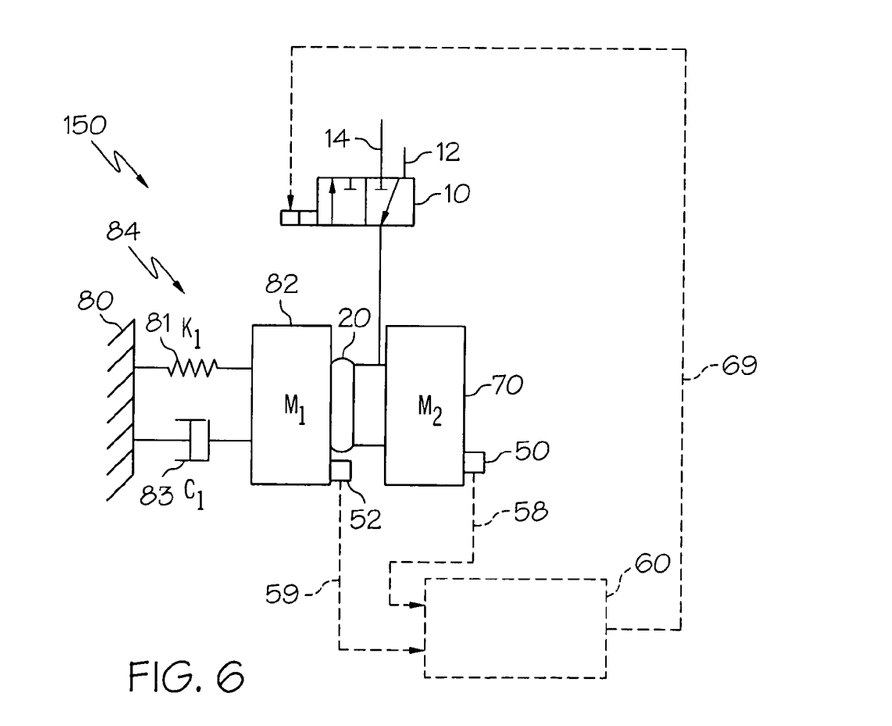
FIG. 6 is a schematic block diagram of an exemplary tuned mass damper system according to one or more embodiments.

FIG. 6 is a schematic of an exemplary tuned mass damper system 150. In the illustrated embodiment, the tuned mass damper 150 comprises an air spring 20 (which may be configured similarly as the air mounts described above with respect to vibration isolation systems) having the damping and stiffness adjustability of the air springs described above via a control valve 10. Only one air spring 20 is illustrated for simplicity as any number of air springs 20 may be utilized. The air spring 20 in the illustrated embodiment may be used as both the resilient element and energy dissipative (damping) element. The control valve 10 may be controlled to adjust the flow of air to and from the air spring 20. The air spring 20 couples an inertia element 70 to a vibrating structure 84 (shown schematically via mass 82, spring 81, damper 83, and the base 80).

The inertia element 70 of the tuned mass damper 150 may be selected to be a fraction of the mass of the vibrating structure that the tuned mass damper is appended to. Embodiments may be tuned by selecting the stiffness of the air spring 20 and the mass of the inertia element 70 such that the natural or resonant frequency of the tuned mass damper 150 is substantially the same as the vibrating frequency of the structure.

The effectiveness of the tuned mass damper 150 may depend on how finely tuned the tuned mass damper 150 is with respect to the vibrating structure 84. As described below, fine-tuning of the tuned mass damper 150 may be accomplished by varying the stiffness level of the air spring or springs 20.

The illustrated embodiment further comprises sensors 50, 52 installed on the tuned mass damper 150 are used to measure the net motion (acceleration and/or displacement) of the air spring 20, i.e., the relative motion of one end of the air spring 20 with respect to the opposite end. The sensory signals 58, 59 provided by the sensors 50, 52 are supplied to a supervisory controller 60 to generate a motion signal corresponding to relative motion of the inertia element 70 with respect to the mass 82 (resembling the appending location of the tuned mass damper on the vibrating structure 84). More or fewer sensors may be utilized to determine the net motion of the air spring 20, which may include the use of a dynamic pressure sensor to measure the air spring dynamic pressure. Using control schemes and feedback control similar to that described above with respect to vibration isolation systems, the supervisory controller 60 is configured to generate a drive signal 69 corresponding to the relative motion signal. The drive signal 69 is applied to the control valve 10 which in turn manipulates the flow of air in and out of the air spring 20. The supervisory controller 60 may be configured to regulate the height (or pressure) and adjust the damping (high damping for tuned dampers and low damping for tuned absorbers) of the air spring 20 in the tuned mass damper 150. If occasional re-tuning is needed, the supervisory controller can also be configured to adjust the stiffness of the air spring 20 in the tuned mass damper 150.

Figure 7:
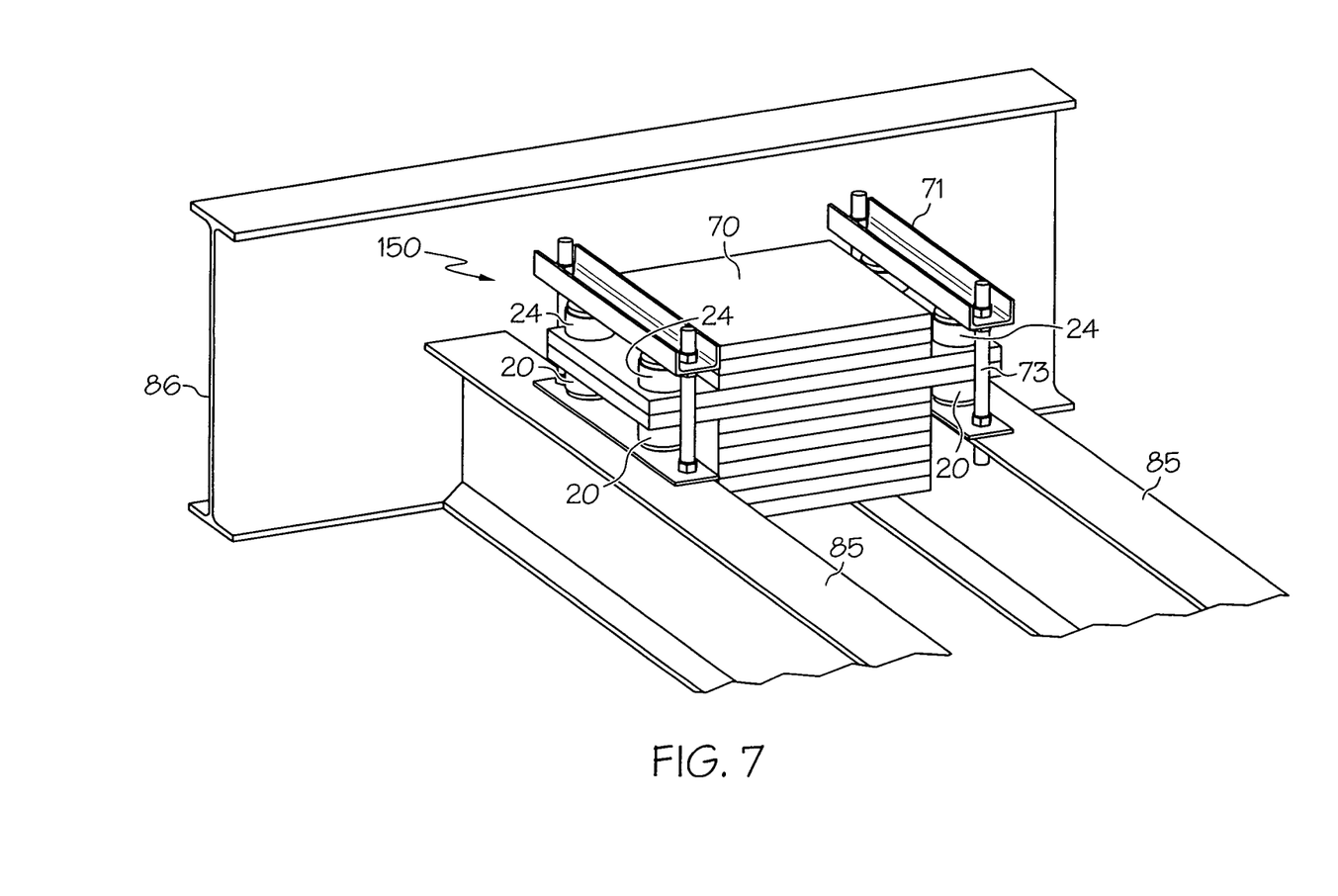
FIG. 7 illustrates a perspective view of a tuned mass damper system appended to a vibrating structure according to one or more embodiments.
Figure 8:
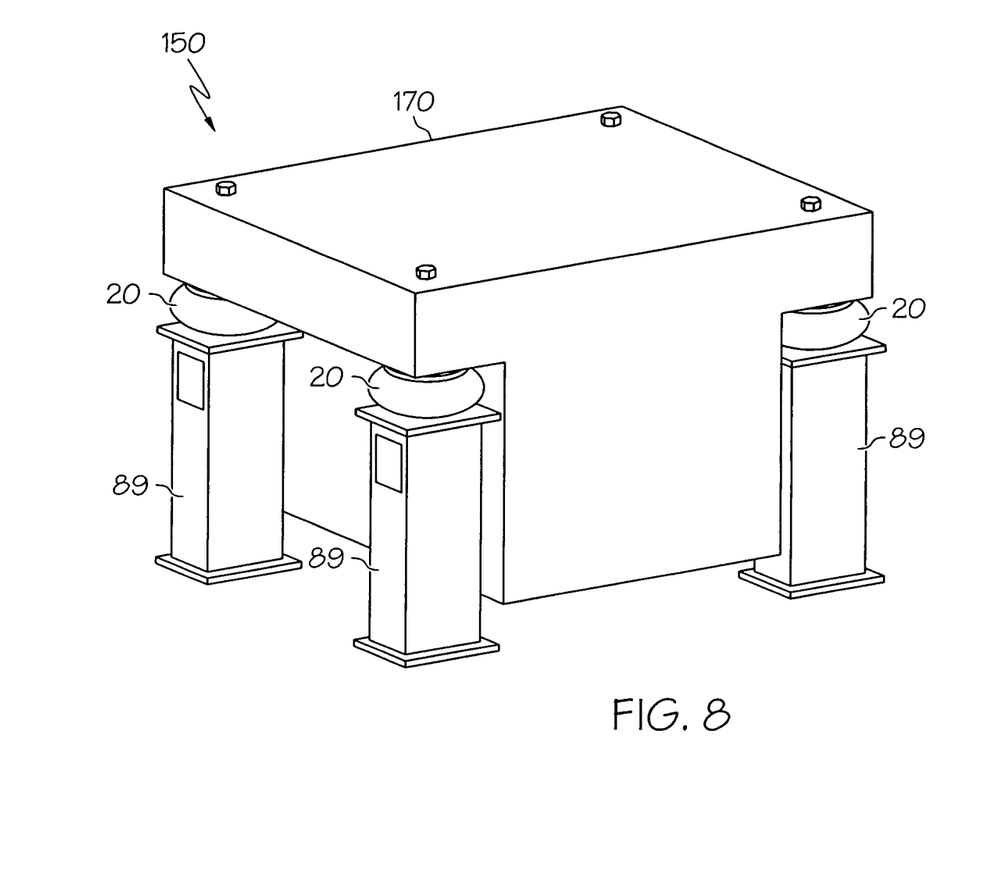
FIG. 8 illustrates a perspective view of a tuned mass damper system according to one or more embodiments.

FIGS. 7 and 8 illustrate two exemplary tuned mass dampers. In the embodiment illustrated in FIG. 7, four main air springs 20 are placed under the inertia element 70 to couple the inertia element 70 to the vibrating structure, which in the illustrated application comprises two I-beams 85 that are also connected to I-beam 86. In addition to the four main air springs 20, four stiffness air springs 24 are positioned above main air springs 20. The four main air springs 20 are coupled to the inertia element 70 at a first, bottom surface of the inertia element 70, while the four stiffness air springs 24 are coupled to the inertia element 70 at a second, top surface of the inertia element. The four stiffness air springs 24 may be used to allow for adjusting the stiffness of the tuned mass damper 150 without over-extending the main air springs 20 or the stiffness air springs 24 and also limiting the lateral motion of the inertial element 70. In a floor vibration control application, a plurality of tune mass dampers may be coupled to structural elements throughout one or more floors of the building. It will be understood that embodiments are not limited to four main air springs or four stiffness air springs, as any number of main and stiffness air springs may be utilized. It will also be understood that the number of stiffness air springs may be different than the number of main air springs.

FIG. 8 illustrates one embodiment of a tuned mass damper 150 that is appended to a vibrating structure (not shown) via four mounting posts 89. The tuned mass damper may be used to dampen the vibration of a large floor of a building. Four main air springs 20 support the inertia element 170, which may also be controlled (using the active damping and active stiffness control techniques described above) to provide damping for, and/or stiffness adjustment (for re-tuning, if need be) of, the tuned mass damper.

In other embodiments, undesirable lateral motion of the tuned mass damper may be constrained by the use of one or more lateral air springs, similar to the lateral stiffness springs 30, 32 (FIG. 4) as described with respect to the vibration isolation systems above. Like the lateral stiffness air springs 30, 32, the lateral air springs may be installed in addition to the main air springs 20 to constrain the lateral motion of the tuned mass damper and assist in adjusting the stiffness in the main vibration direction.

The effectiveness of tuned mass dampers may depend on how precisely they are tuned with respect to the vibrating structure to which they are appended. In many applications, the tuning frequency is not quite constant and varies with the operating conditions of the system. For example, the resonant frequencies of office building floors vary with the number of occupants and the arrangement of furniture on the floors. The use of a tuned mass damper in such system, may only be effective if they are adjustable and are continuously retuned to the current resonant frequency of the vibrating structure. Such dampers require a tuning algorithm that can automatically adjust the stiffness of the air spring.

Fine-tuning and re-tuning of embodiments of the present disclosure may be accomplished through the use of software residing in the supervisory controller 60 or other control hardware, using the active and semi-active stiffness control features described above without physically modifying the hardware. Moreover, self-tuning capabilities may be incorporated into the supervisor controller 60 so that the tuned mass damper may be constantly fine-tuned, automatically.

A self-tuning strategy for tuned damping applications may be based on power spectral analysis of a measurement, e.g., an acceleration of the vibrating structure provided by sensor element 52. The supervisory controller 60 may evaluate the incoming sensory signals and determine a vibration frequency of the tuned mass damper. Incremental change in the tuned mass damper's resonant frequency is effectuated by adjusting the stiffness of the tuned mass damper by controlling the flow of air to and from the air spring or springs. The incremental frequency by which the tuning frequency is readjusted in each iteration may be evaluated using an iterative adaptation scheme. The process may be repeated until the absorber is retuned.

Embodiments of the present disclosure allow for enhanced vibration isolation in conjunction with effective shock isolation. Embodiments may be configured as vibration isolation systems to provide on-demand damping at low frequencies to improve shock isolation and provide minimal damping at higher frequencies to improve high-frequency vibration isolation, while also dynamically varying the stiffness of the system to limit or allow for low-frequency softening to improve shock or vibration isolation. To address the low lateral stiffness in some air mounts which might cause large motion of the isolated mass in the lateral direction, an even number of stiffness air mounts may be installed in the lateral directions of some embodiments. An adjustment to pressure inside these stiffness air mounts not only vary the lateral stiffness of the vibration isolation system but also adjusts the stiffness of the vibration isolation system in the main vibration direction, thereby providing semi-active stiffness control in the lateral and main vibration direction. Embodiments may also be configured as tuned mass dampers or dynamic absorbers that utilize active damping, active and/or semi-active stiffness control. In such embodiments, the supervisory controller enables the air springs to act as both the spring and damper.

It is noted that terms like "commonly," and "typically," if utilized herein, should not be read to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the terms "approximately" and "substantially" are utilized herein to represent the inherent degree of uncertainty that may be attributed to any quantitative comparison, value, measurement, or other representation. The terms "approximately" and "substantially" are also utilized herein to represent the degree by which a quantitative representation may vary from a stated reference without resulting in a change in the basic function of the subject matter at issue.

It is noted that recitations herein of a component of the present invention being "configured" or "programmed" in a particular way, "configured" or "programmed" to embody a particular property, or function in a particular manner, are structural recitations as opposed to recitations of intended use. More specifically, the references herein to the manner in which a component is "configured" or "programmed" denotes an existing physical condition of the component and, as such, is to be taken as a definite recitation of the structural characteristics of the component.

It is also noted that recitations herein of "at least one" component, element, etc., should not be used to create an inference that the alternative use of the articles "a" or "an" should be limited to a single component, element, etc.

It is further noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

What is claimed is:

1. A tuned mass damper comprising an inertia element, at least one air spring comprising at least one main air spring and at least one stiffness air spring, at least one control valve, a compressed air supply, a vibrating structure, and a supervisory controller, wherein:
    the control valve is pneumatically coupled to the main air spring, the compressed air supply, and atmosphere, and is operable to adjust a flow of air to and from the main air spring;
    the vibrating structure comprises a spring, a damper, a base, and a mass;
    the inertia element is configured to be coupled to the mass of the vibrating structure such that the main air spring is positioned between the inertia element and the mass of the vibrating structure;
    a mass of the inertia element and a stiffness of the main air spring are selected such that a resonant frequency of the inertia element and the main air spring is substantially equal to an initial vibration frequency of the vibrating structure;
    the stiffness air spring is operable to enter an engaged state wherein the stiffness air spring is engaged with the inertia element, and a disengaged state wherein the stiffness air spring is disengaged from the inertia element; and
    the supervisory controller is operable to:
        dynamically fine-tune a damping level of the main air spring dependent on an acceleration feedback of the mass, relative to the inertia element, and a stiffness level of the main air spring dependent on a velocity feedback of the mass, relative to the inertia element, by applying a drive signal to the control valve;
        receive an engagement signal;
        engage the stiffness air spring with the inertia element in accordance with the engagement signal;
        vary an air pressure in the stiffness air spring to semi-actively adjust a stiffness level of the tuned mass damper in a lateral vibration direction and a main vibration direction in accordance with the engagement signal; and
        disengage the stiffness air spring in accordance with the engagement signal.

2. A tuned mass damper as claimed in claim 1 wherein the supervisory controller is operable to adjust the stiffness level of the main air spring such that the resonant frequency of the inertia element and the main air spring remains substantially equal to the vibration frequency of the vibrating structure.

3. A tuned mass damper as claimed in claim 1 wherein:
    the tuned mass damper further comprises a first sensor element positioned on the inertia element and a second sensor element positioned on the mass of the vibrating structure;
    the first sensor element is operable to provide a first signal corresponding to the acceleration of the inertia element and the second sensor element is operable to provide a second signal corresponding to an acceleration of the mass of the vibrating structure;
    the first and second signals generate a relative motion signal corresponding to a motion of a first end of the main air spring with respect to a motion of a second end of the main air spring, wherein the relative motion signal provides the acceleration feedback of the mass; and
    the supervisory controller is operable to apply the drive signal to the control valve based at least in part on the relative motion signal.

4. A tuned mass damper as claimed in claim 1 further comprising a pressure sensor operable to provide an air pressure signal to the supervisory controller, wherein:
    the air pressure signal corresponds to a pressure of the main air spring; and
    the supervisory controller is operable to receive the air pressure signal from the pressure sensor and apply the drive signal to the control valve based at least in part on the air pressure signal.

5. A tuned mass damper as claimed in claim 1 wherein the at least one main air spring further comprises a plurality of main air springs positioned about the inertia element between the inertia element and the mass of the vibrating structure.

6. A tuned mass damper as claimed in claim 1 wherein:
    the at least one main air spring comprises one or more pairs of air springs comprising a first air spring and a second air spring positioned above the inertia element;
    the first air spring of each pair of air springs is positioned between a first surface of the inertia element and the mass of the vibrating structure; and
    the second air spring of each pair of air springs is positioned between a second surface of the inertia element and the mass of the vibrating structure.

7. A tuned mass damper as claimed in claim 3 wherein:
    the tuned mass damper further comprises at least one displacement sensor positioned between the vibrating structure and the inertia element;
    the at least one displacement sensor is operable to provide a signal corresponding to a relative displacement of the inertia element with respect to the vibrating structure;
    the signal generates a relative motion signal corresponding to a motion of a first end of the main air spring with respect to a motion of a second end of the air spring, where motion includes displacement; and the supervisory controller is operable to apply the drive signal to the control valve based at least in part on the relative motion signal.

\* \* \* \* \*